United States Patent [19]
Goldberg

[11] 3,787,817
[45] Jan. 22, 1974

[54] MEMORY AND LOGIC MODULE

[75] Inventor: Jacob Goldberg, Palo Alto, Calif.

[73] Assignee: The United States of America as represented by the Secretary of the Navy, Washington, D.C.

[22] Filed: June 21, 1972

[21] Appl. No.: 265,093

[52] U.S. Cl. .............................. 340/172.5, 340/173
[51] Int. Cl. .............................. G11c 11/34
[58] Field of Search .............................. 340/172.5, 173

[56] References Cited

UNITED STATES PATENTS

| | | | |
|---|---|---|---|
| 3,700,873 | 10/1972 | Yhap | 340/172.5 |
| 3,460,094 | 8/1969 | Pryor | 340/172.5 |
| 3,473,160 | 10/1969 | Wahlstrom | 340/172.5 |
| 3,641,511 | 2/1972 | Cricchi et al. | 340/173 |
| 3,681,761 | 8/1972 | Schuenemann et al. | 340/172.5 |
| 3,478,322 | 11/1969 | Evans | 340/172.5 |
| 3,638,194 | 1/1972 | Matsushita et al. | 340/172.5 |
| 3,657,706 | 4/1972 | Horgan et al. | 340/172.5 |
| 3,665,426 | 5/1972 | Gross et al. | 340/172.5 |
| 3,670,308 | 6/1972 | Tutelman | 340/172.5 |
| 3,685,020 | 8/1972 | Meade | 340/172.5 |

*Primary Examiner*—Paul J. Henon
*Assistant Examiner*—John P. Vandenburg
*Attorney, Agent, or Firm*—R. S. Sciascia; P. Schneider; T. Vezeau

[57] ABSTRACT

A system for augmenting a computer memory with storage and logic functions so as to provide parallel data processing and serial accessing capability consisting of a hybrid combination of a random-access memory and a cellular logic-in-memory array. The basic module of the system is a monolithic semiconductor array. Various other component parts, such as address logic, data logic and word logic may be included as part of the module.

5 Claims, 4 Drawing Figures

MEMORY AND LOGIC MODULE

BACKGROUND OF THE INVENTION

The invention relates to a data storage and access arrangement for particular use in digital computers.

A system is disclosed for augmenting a computer memory with storage and logic functions so as to provide a substantial amount of parallel data processing and also a more powerful serial accessing capability. The system may be considered to be a hybrid combination of a random-access memory (RAM) and a cellular logic-in-memory (LIM) array. From that viewpoint, the system provides for a flexible balance between the two types of memories—hence, as the costs of production decrease, the LIM fraction may be increased without modifying the design. The system also features a close coupling between the RAM and LIM portions. This avoids the serious problem of input-output limitations that occurs in stand-alone LIM processing units, which exchange only one word at a time with the main memory.

The system is intended for LSI realization. For this reason, the system is partitioned in such a way as to permit the use of one module type, with a modest number of terminals on the module.

DETAILED DESCRIPTION OF THE PREFERRED EMBODIMENT

Figure 1:
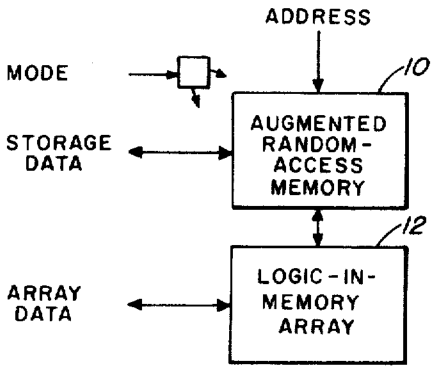
FIG. 1 shows the overall system concept.

The system has two major sections—a nearly conventional (serial, randomly-addressed bit-parallel) memory (RAM) 10, and a logic-in memory (LIM) array 12, as shown in FIG. 1. Both sections may operate simultaneously and independently, and data may be exchanged between the sections. The system is organized in blocks, with one word of the LIM array associated with each block of RAM.

In the RAM section, one word of one block is selected at a time for reading or writing. In the LIM section, all the bits of all the words are active simultaneously. When transferring data between sections, one word of the RAM section of each block is coupled to the LIM word within the block—that is, for n blocks, n words may be exchanged between RAM and LIM sections simultaneously.

The system includes some refinements in the RAM section. One refinement is the local (at the block) modification of the word-address information distributed to all blocks. An example of a useful modification is the addition of a locally stored constant—as in the ILLIAC IV computer. Another refinement is the local modification of the data word. For example, several mask vectors may be stored at each block so as to permit the use of arbitrary lengths and displacements of data segments within the word boundaries of different memory blocks. A third refinement is the provision of one or two bits of storage, with logic, associated with each word of the RAM section. Such logic could be used to accumulate a selected bit-slice of RAM data, and to augment the accessing of RAM data. Examples of such augmentation are (1) enabling/disabling the normal selection of a word and (2) autonomous selection of a word—i.e., without explicit addressing.

Figure 2:
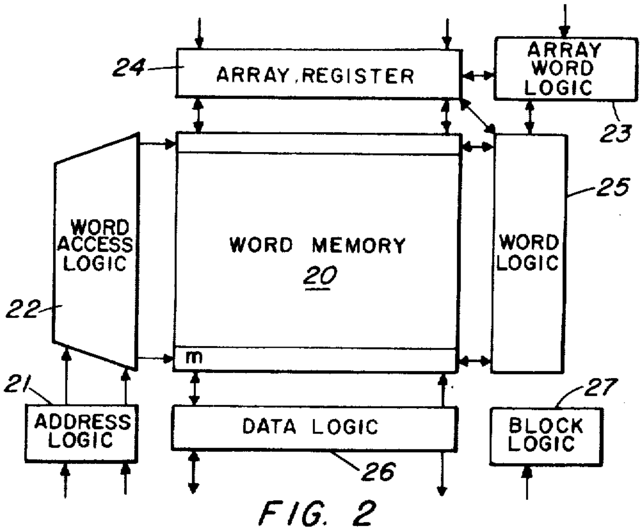
FIG. 2 shows the functional arrangement of the various parts of the system.

The basic module of the system is a memory block module which is envisioned as a monolithic semiconductor array. The module is illustrated in FIG. 2. Several optional networks, which provide useful but inessential features, are included. The following description gives the basic functions of the various component parts, with examples of the optional functions:

WM Word Memory 20—an array of data storage elements, arranged in words; there is one set of data busses, and one word may be activated at a time.

WAL Word Access Logic 22—a combinational logic net (e.g., a decoding tree) that activates one word in WM.

AL Address Logic 21—a sequential net that couples word address information into WAL, possibly with modification, such as addition of a stored number.

DL Data Logic 21—a sequential net that couples the word memory and the external system for reading and writing, possibly with modification, such as masking or permutation (e.g., shifting) under control of a stored vector.

WL Word Logic 25—a sequential net, storing a few bits per word of WM, having communication with WAL, WM, and possibly the array register (see next). Examples of functions are:

with WAL—masking or replacing WAL selection with WM—reading or writing a bit-slice with array register—simple data transfer internally—a bit may be shifted or a string of bits generated.

AR Array Register 24—a complex net, capable of storing and processing a word of data; it may be coupled to the data lines of WM, or it may be coupled to the AR's of other modules. It comprises an element of an LIM array, with logic at the bit level. A wide range of array processes are of interest, such as those disclosed in U.S. Pat. No. 3,514,760, U.S. Pat. No. 3,505,653 and U.S. Pat. No. 3,534,331, all to Kautz.

AWL Array Word Logic 23—a net capable of storing a few bits of information, for exchange with specified AR cells, or for qualification of AR processes.

BL Block Logic 27—a net serving to decode control instructions for the various modes of block operation, including the masking of block operations under control of a stored bit from Array Word Logic 23.

The AL, DL and WL networks are individually optional. The delay introduced may be significant in high-speed memories.

Figures 3, 4:
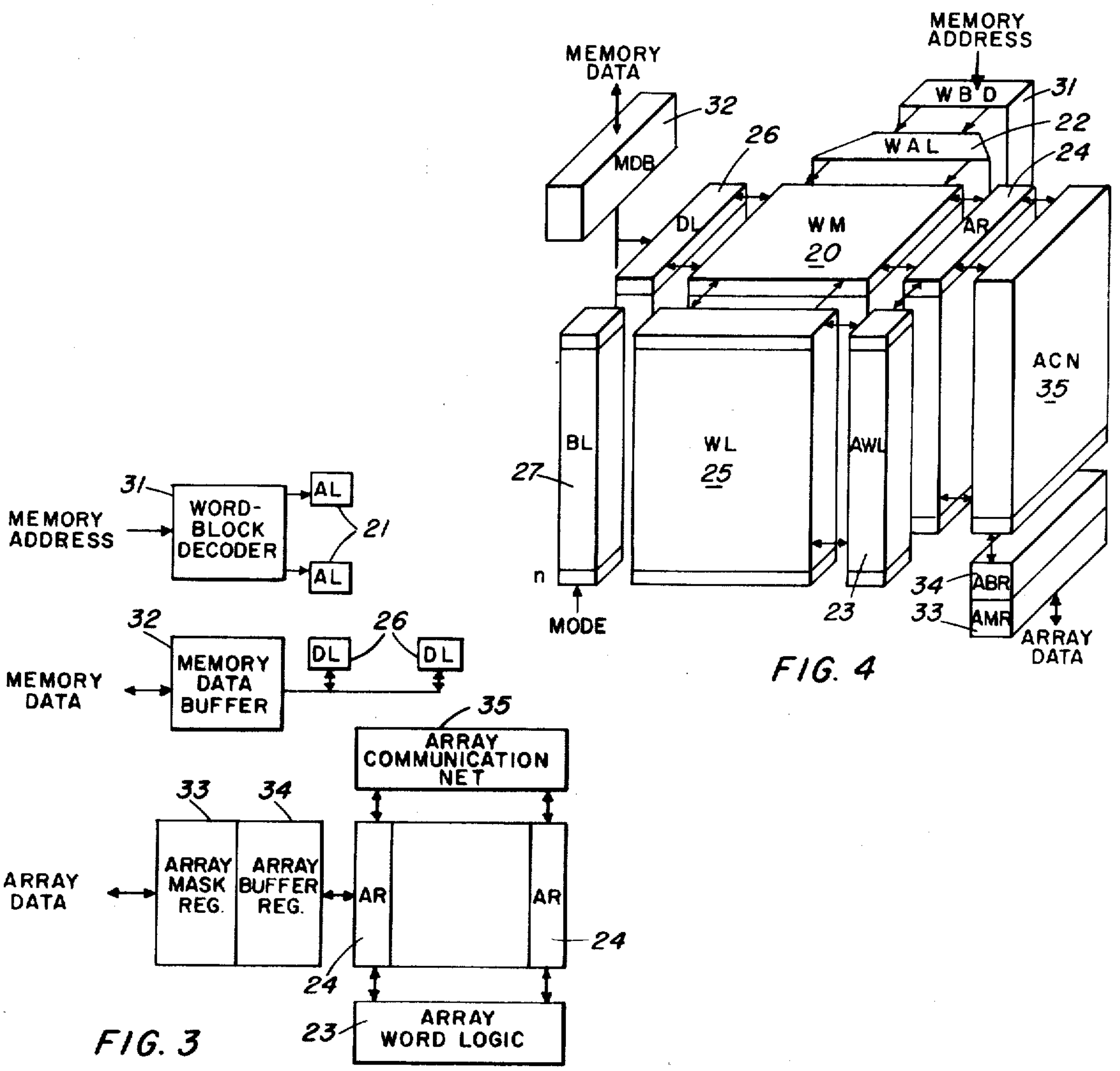
FIG. 3 shows the overall system connections.
FIG. 4 shows the physical arrangement of the various parts of the module.

The overall system connections are illustrated in FIG. 3, and have the following structure:

Serial Addressing:

1. The address of a desired word is partially decoded by the Word Block Decoder (WBD) 31 module, and the address of a word within a block is directed to the AL of a selected block.

2. The external data line is coupled to the DL of a selected block via a Memory Data Buffer (MDB) 32 and a common memory bus.

Array Processing:

1. The set of AR's 24 comprise a LIM array. The data busses of this array are coupled to the external system via an Array Buffer Register (ABR) 34, and an Array Mask Register (AMR) 33. The vector stored in AMR serves to activate the processing within individual bit-columns of the AR array.
2. Communication among the AR's may be achieved in several ways:
   a. by direct connection between neighboring AR's
   b. by connection to a common array bus
   c. by connection to an Array Communication Net (ACN) 35; some useful permutations would be those of a directed-star-polygon or a complete permutation network, with masked transfers.
3. Selected AR bit-columns may communicate with the Array Word Logic (AWL) network 23, which may also serve to control the activation of individual AR's.

Function Setting:

Data may be stored in the AL and DL blocks, in order to specify the transformations on serial addressing and data transfer. The storage may be accomplished by presenting the information on the normal signal lines, while issuing the appropriate command to all BL units.

Several options are available in the numbering of RAM locations. If the *m* locations within a block are numbered sequentially, i.e., if the ADL input is driven by the least significant digits of the address code, then a transfer between RAM and LIM applies to words $j$, $j + m$, $j + 2m$, etc. If the process of transferring a contiguous block between RAM and LIM is desired, this may be obtained by numbering the successive locations of a block in steps of $n$ ($n$ blocks per memory), i.e., 0, $n$, $2n$, etc. In this case, address decoding would be simplified for $n$ a power of 2, since the blocks could be driven directly by the most significant digits of the system address.

A desirable physical arrangement of the modules would be a vertical stack, as in FIG. 4. In this arrangement, the interconnection lines are short and uniform. The connections from the AR's to the ACN are not fully specified here. It is possible to distribute the ACN functions among the modules, in which case, only edge connections along the face of the stack are needed; otherwise, some special connectors, like those used in "mother-board" packaging may be needed.

The major operational feature of the system is that, for $n$ blocks and $m$ words per block, all the data may be passed through a complex, bit and word-parallel array process in $m$ steps, where the time for loading and unloading the array in each step is small compared to array processing time. This is useful in the processing of large files, and in the rapid searching of multi-branch decision trees.

The minor operational features of the system are the several augmentations on block address, word address and data signals in the conventional memory mode. These functions could be programmed within the associated arithmetic-logic processing unit, but the possibility for specifying these augmentations independently at the blocks would tend to simplify and accelerate the accessing of data.

The major manufacturing features of the system are the flexible choice of the balance between conventional and parallel functions, without major design change, the modularity of component design, and the relative simplicity of assembly.

Obviously many modifications and variations of the present invention are possible in light of the above teachings. It is therefore to be understood that, within the scope of the appended claims, the invention may be practiced otherwise than as specifically described.

What is claimed is:

1. A memory and logic module for use in a digital computer comprising:

a memory organized into a plurality of randomly addressed, bit parallel word memory blocks;

logic-in-memory means wherein each individual memory cell of said logic-in-memory contains storage capacity and logic elements to act on the data contained within said memory cells, said logic-in-memory being connected such that each word storage within said logic-in-memory means is associated with a different one of said plurality of word memory blocks;

word access logic means connected to each of said word memory blocks for receiving a memory address from an external system and applying an address selection signal to that address location in each of said word memory blocks, this address selection signal acting to transfer word data stored at this address in each of said word memory blocks to the word storage in said logic-in-memory means associated with each of said word memory blocks;

a word logic network acting in one of two modes to select a single word or a block of words in said word memory blocks of said memory, to be transferred to said logic-in-memory, one of said modes being to transmit the address selection signals from said word access logic means to each of said word memory blocks, the second of said modes being to generate its own address selection signals to each of said word memory blocks independently of said word access logic means.

2. A memory and logic module as in claim 1, wherein said logic-in-memory means further comprises an array word logic means acting to hold values indicative of the outcome of tests performed by said logic-in-memory on its word contents.

3. A memory and logic module as in claim 2 further comprising:

a control logic connected to said array word logic means and to each of said word memory blocks and acting to permit or inhibit communication between said plurality of word blocks and their respective logic-in-memory word storage in accordance with the values held in said array word logic means indicating the outcome of logic-in-memory tests thus permitting the selection of data to be processed without external control.

4. A memory and logic module as in claim 3 wherein each of said word memory blocks further comprises a buffer register acting to provide a serial interface between an external system and each of said word memory blocks.

5. A memory and logic module as in claim 3 wherein said logic-in-memory further comprises an array buffer register and an array mask register connected at the input to said logic-in-memory from an external system.

* * * * *